(12) United States Patent
Schmid et al.

(10) Patent No.: US 6,921,744 B2
(45) Date of Patent: Jul. 26, 2005

(54) HYDROXY MIXED ETHERS HAVING A HIGH DEGREE OF ETHOXYLATION, COMPOSITIONS CONTAINING THE SAME AND ANTI-FOAM USES THEREFOR

(75) Inventors: Karl Heinz Schmid, Mettman (DE); Detlev Stanislowski, Mettman (DE); Hans-Christian Raths, Monheim (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 152 days.

(21) Appl. No.: 10/470,898

(22) PCT Filed: Feb. 1, 2002

(86) PCT No.: PCT/EP02/01052
§ 371 (c)(1),
(2), (4) Date: Aug. 1, 2003

(87) PCT Pub. No.: WO02/061025
PCT Pub. Date: Aug. 8, 2002

(65) Prior Publication Data
US 2004/0063602 A1 Apr. 1, 2004

(30) Foreign Application Priority Data

Feb. 1, 2001 (DE) .......................... 101 04 368
Mar. 13, 2001 (DE) .......................... 101 11 838
Mar. 23, 2001 (DE) .......................... 101 14 172
Mar. 30, 2001 (DE) .......................... 101 16 020

(51) Int. Cl.⁷ .................... C11D 1/722; C11D 1/86; C11D 3/37; C11D 3/386

(52) U.S. Cl. .................... 510/356; 510/360; 510/421; 510/422; 510/426; 510/470; 510/475; 510/505; 510/506

(58) Field of Search .................... 510/356, 360, 510/421, 422, 426, 470, 475, 505, 506

(56) References Cited

U.S. PATENT DOCUMENTS

| | | |
|---|---|---|
| 4,199,465 A | 4/1980 | Rodriguez |
| 5,312,932 A | 5/1994 | Behler et al. |
| 5,322,957 A | 6/1994 | Fabry et al. |
| 5,484,531 A | 1/1996 | Kuehne et al. |
| 5,759,987 A | 6/1998 | Haerer et al. |
| 6,831,052 B2 * | 12/2004 | Weuthen et al. .......... 510/356 |

| | | |
|---|---|---|
| 2002/0107165 A1 | 8/2002 | Weuthen et al. |

FOREIGN PATENT DOCUMENTS

| | | | |
|---|---|---|---|
| DE | 24 32 757 A1 | 1/1976 | |
| DE | 42 04 700 A1 | 8/1993 | |
| DE | 43 23 252 C2 | 1/1995 | |
| DE | 197 38 866 A1 | 3/1999 | |
| DE | 19738866 * | 3/1999 | .......... C11D/1/825 |
| EP | 0 561 825 B1 | 9/1993 | |
| EP | 0 561 999 B1 | 9/1993 | |
| EP | WO 01/55285 * | 8/2001 | ............ C11D/3/37 |
| EP | 1 167 499 B1 | 1/2002 | |
| WO | WO 01/79401 A1 | 10/2001 | |

OTHER PUBLICATIONS

Biermann, et al., "Alkylpolyglucoside—Technologie und Eigenschaften", Starch/Stärke, vol. 45, VCH Verlagsgesellschaft mbH, Weinheim, (1993), pp. 281–288, no month given; not translated.

Salka, "Alkyl Polyglycosides Properties and Applications", Cosmetics and Toiletries, vol. 108, (Mar., 1993), pp. 89–94.

Kahre, et al, "Alkylpolglycoside—Ein neues Konzept für Pflege und Verträglichkeit in der Kosmetik", SÖFW–Journal, vol. 121, No. 8, (1995), pp. 598, 600–601, 604–611, no month given; not translated.

Biswas, et al., "Surface–Active Properties of Sodium Salts of Sulfated Fatty Acid Monoglycerides", The Journal Of The American Oil Chemists' Society, vol. 37, (Apr., 1960), pp. 171–175.

Ahmed, "Efficient Synthesis of Fatty Monoglyceride Sulfates from Fatty Acids and Fatty Acid Methyl Esters", JAOCS, vol. 67, No. 1, (Jan., 1990), pp. 8–14.

* cited by examiner

*Primary Examiner*—Brian P. Mruk

(57) ABSTRACT

Hydroxy mixed ethers of the general formula (I):

$$R^1O[CH_2CH_2O]_xCH_2CH(OH)R^2 \quad (I)$$

wherein $R^1$ represents a linear or branched, alkyl or alkenyl group having from 4 to 22 carbon atoms; $R^2$ represents a linear or branched, alkyl or alkenyl group having from 2 to 22 carbon atoms; and x represents a number of from 40 to 80, are described along with compositions containing such hydroxy mixed ethers in conjunction with other surfactants. Also described are various anti-foaming uses for such ethers and compositions containing the same.

25 Claims, No Drawings

HYDROXY MIXED ETHERS HAVING A HIGH DEGREE OF ETHOXYLATION, COMPOSITIONS CONTAINING THE SAME AND ANTI-FOAM USES THEREFOR

BACKGROUND OF THE INVENTION

Compositions for the washing and cleaning of hard non-textile surfaces occurring in the home and in the institutional sector are generally intended to generate little foam in use, the foam they do generate being expected to collapse significantly in a few minutes. Compositions of this type are well-known and established on the market. They are essentially aqueous surfactant solutions of various kinds with and without added builders, solubilizers (hydrotropes) or solvents. Although the consumer prefers the in-use solution to foam to a certain extent at the beginning of the cleaning task as proof of effectiveness, the foam is expected to collapse rapidly so that cleaned surfaces do not have to be rewiped. To this end, low-foaming nonionic surfactants are normally added to compositions of the type mentioned.

Today, machine-washed tableware has to meet stricter requirements than hand-washed tableware. Thus, even tableware completely free from food residues is regarded as unsatisfactory when, after dishwashing, it still has whitish stains which are attributable to water hardness or other mineral salts and which come from water droplets that have remained on the tableware through lack of wetting agent and dried.

Accordingly, to obtain bright, spotless tableware, rinse agents have to be used. The addition of liquid or solid rinse agent—which may be separately added or which is already present in ready-to-use form together with the detergent and/or regenerating salt ("2-in-1", "3-in-1", for example in the form of tablets and powders)—ensures that the water drains completely from the tableware so that the various surfaces are bright and free from residues at the end of the dishwashing program.

Commercially available rinse agents are mixtures of, for example, nonionic surfactants, solubilizers, organic acids and solvents, water and optionally preservative and perfumes.

The function of the surfactants in these compositions is to influence the interfacial tension of the water in such a way that it is able to drain from the tableware as a thin, coherent film so that no droplets of water, streaks or films remain behind during the subsequent drying process (so-called wetting effect). Accordingly, another function of surfactants in rinse agents is to suppress the foam generated by food residues in the dishwashing machine. Since the rinse agents generally contain acids to improve the clear drying effect, the surfactants used also have to be relatively hydrolysis-resistant towards acids.

Rinse agents are used both in the home and in the institutional sector. In domestic dishwashers, the rinse agent is generally added after the prerinse and wash cycle at 40 to 65° C. Institutional dishwashers use only one wash liquor which is merely replenished by addition of the rinse agent solution from the preceding wash cycle. Accordingly, there is no complete replacement of water in the entire dishwashing program. Because of this, the rinse agent is also expected to have a foam-suppressing effect, to be temperature-stable in the event of a marked drop in temperature from 85 to 35° C. and, in addition, to be satisfactorily resistant to alkali and active chlorine.

DE-A1 19738866 describes surfactant mixtures of hydroxy mixed ethers and nonionic surfactants, such as optionally end-capped fatty alcohol polyethylene glycol/polypropylene glycol ethers, which have very good foaming behavior and show excellent clear rinse effects in rinse agents.

It is known from German Offenlegungsschrift DE-OS 2432757 that hydroxy mixed ethers can be used as foam suppressors in laundry detergents, dishwashing detergents and cleaning compositions.

The problem addressed by the present invention was to provide washing, dishwashing and cleaning compositions which, at one and the same time, would show good foaming and cleaning behavior, more particularly very good drainage behavior, i.e. improved wetting behavior on plastic surfaces, and high material compatibility, more particularly with plastics. In addition, the invention sought to enable solid cleaning formulations to be produced by a simplified process.

The problem stated above has been solved by the use of selected surfactants of the hydroxy mixed ether type.

BRIEF SUMMARY OF THE INVENTION

The present invention relates, in general, to highly ethoxylated hydroxy mixed ethers in conjunction with laundry detergents, dishwashing detergents and cleaning compositions and to the use of these hydroxy mixed ethers as defoamers in laundry detergents, dishwashing detergents and cleaning compositions.

The present invention relates to hydroxy mixed ethers (HMEs) corresponding to general formula (I):

$$R^1O[CH_2CH_2O]_xCH_2CH(OH)R^2 \qquad (I)$$

in which $R^1$ is a linear or branched alkyl and/or alkenyl group containing 4 to 22 carbon atoms, $R^2$ is a linear or branched alkyl and/or alkenyl group containing 2 to 22 carbon atoms and x=40 to 80.

DETAILED DESCRIPTION OF THE INVENTION

Hydroxy Mixed Ethers

Hydroxy mixed ethers corresponding to formula (I) are known from the literature and are described, for example, in German patent application DE 19738866. They are prepared by reaction of 1,2-epoxyalkanes ($R^2CHOCH_2$), where $R^2$ is an alkyl and/or alkenyl group containing 2 to 22 and more particularly 6 to 16 carbon atoms, with alkoxylated alcohols. Hydroxy mixed ethers preferred for the purposes of the invention are those derived from alkoxylates of monohydric $C_{4-18}$ alcohols with the formula $R^1$—OH, $R^1$ being an aliphatic, saturated, linear or branched alkyl group, more particularly containing 6 to 16 carbon atoms. Examples of suitable straight-chain alcohols are butan-1-ol, caproic alcohol, oenanthic alcohol, caprylic alcohol, pelargonic alcohol, capric alcohol, undecan-1-ol, lauryl alcohol, tridecan-1-ol, myristyl alcohol, pentadecan-1-ol, palmityl alcohol, heptadecan-1-ol, stearyl alcohol, nonadecan-1-ol, arachidyl alcohol, heneicosan-1-ol, behenyl alcohol and the technical mixtures thereof obtained in the high-pressure hydrogenation of technical methyl esters based on fats and oils. Examples of branched alcohols are so-called oxo alcohols which generally contain 2 to 4 methyl groups as branches and are produced by the oxo process and so-called Guerbet alcohols which are branched in the 2-position by an alkyl group. Suitable Guerbet alcohols are 2-ethyl hexanol, 2-butyl octanol, 2-hexyl decanol and/or 2-octyl dodecanol.

The alcohols are used in the form of their alkoxylates which are prepared in known manner by reaction of the alcohols with ethylene oxide. Alkoxylates of alcohols formed by reaction with 40 to 80 mol ethylene oxide are preferably used. Hydroxy mixed ethers containing 40 to 60 ethylene oxide units are particularly preferred.

Hydroxy mixed ethers derived from ethoxylates of monohydric alcohols with the formula $R^1$—OH($R^1$=linear alkyl group and x=40 to 60) which contain 6 to 18, preferably 6 to 16 and more particularly 8 to 10 carbon atoms are preferred for the purposes of the invention.

Hydroxy mixed ethers corresponding to formula (I), where $R^1$ is a $C_{8-10}$ alkyl group based in particular on a native fatty alcohol, $R^2$ is a $C_{10}$ alkyl group, more particularly alinear alkyl group, and x=40 to 60, are most particularly preferred.

In another embodiment, the invention relates to compositions which contain hydroxy mixed ethers according to the invention and other typical ingredients of laundry detergents, dishwashing detergents and cleaning compositions. As described in the following, these typical ingredients include alkyl and/or alkenyl oligoglycosides, other nonionic surfactants, anionic surfactants, builders, enzymes and other auxiliaries and additives.

Alkyl and/or Alkenyl Oligoglycosides

In another embodiment, the compositions according to the invention contain alkyl and/or alkenyl oligoglycosides corresponding to formula (II):

$$R^5O\text{—}[G]_p \qquad \text{(II)}$$

in which $R^5$ is a $C_{4-22}$ alkyl and/or alkenyl group containing 4 to 22 carbon atoms, G is a sugar unit containing 5 or 6 carbon atoms and p is a number of 1 to 10.

They may be obtained by the relevant methods of preparative organic chemistry. The synoptic articles by Biermann et al. in Starch/Stärke 45, 281 (1993), B. Salka in Cosm. Toil. 108, 89 (1993) and J. Kahre et al. in S ÖFW-Journal, No. 8, 598 (1995) are cited as representative of the extensive literature available on the subject. The alkyl and/or alkenyl oligoglycosides may be derived from aldoses or ketoses containing 5 or 6 carbon atoms, preferably glucose. Accordingly, the preferred alkyl and/or alkenyl oligoglycosides are alkyl and/or alkenyl oligoglucosides. The alkyl group $R^5$ may be derived from primary saturated alcohols. Typical examples are butan-1-ol, caproic alcohol, oenanthic alcohol, caprylic alcohol, pelargonic alcohol, capric alcohol, undecan-1-ol, lauryl alcohol, tridecan-1-ol, myristyl alcohol, pentadecan-1-ol, cetyl alcohol, palmityl alcohol, heptadecan-1-ol, stearyl alcohol, isostearyl alcohol, nonadecan-1-ol, arachidyl alcohol, heneicosan-1-ol and behenyl alcohol and the technical mixtures thereof obtained, for example, in the hydrogenation of technical fatty acid methyl esters or in the hydrogenation of aldehydes from Roelen's oxo synthesis. The alkenyl group $R^5$ may be derived from primary unsaturated alcohols. Typical examples of unsaturated alcohols are undecen-1-ol, oleyl alcohol, elaidyl alcohol, ricinolyl alcohol, linoleyl alcohol, linolenyl alcohol, gadoleyl alcohol, arachidonyl alcohol, erucyl alcohol, brassidyl alcohol, palmitoleyl alcohol, petroselinyl alcohol, arachyl alcohol and the technical mixtures thereof obtainable in the manner described above. Alkyl or alkenyl groups $R^5$ derived from primary $C_{6-16}$ alcohols are preferred. Alkyl oligoglucosides having a chain length of $C_8$ to $C_{10}$, which are obtained as first runnings in the separation of technical $C_{8-18}$ coconut fatty alcohol by distillation and which may contain less than 6% by weight of $C_{12}$ alcohol as an impurity, and also alkyl oligoglucosides based on technical $C_{9/11}$ oxoalcohols are particularly suitable. In addition, the alkyl or alkenyl group $R^5$ may also be derived from primary alcohols containing 12 to 14 carbon atoms.

The index p in general formula (II) indicates the degree of oligomerization (DP), i.e. the distribution of mono- and oligoglycosides, and is a number of 1 to 10. Whereas p in a given compound must always be an integer and, above all, may assume a value of 1 to 3, the value p for a certain alkyl oligoglycoside is an analytically determined calculated quantity which is generally a broken number. Alkyl and/or alkenyl oligoglycosides having an average degree of oligomerization p of 1.1 to 2.0 are preferably used. Alkyl and/or alkenyl oligoglycosides having a degree of oligomerization of less than 2.0 and, more particularly, between 1.2 and 1.7 are preferred from the applicational point of view.

Alkyl and/or alkenyl oligoglycosides corresponding to formula (II), where p is a number of 1 to 3 and $R^5$ is a $C_{6-16}$ alkyl group, are preferably used.

In a preferred embodiment, the compositions according to the invention contain 0.01 to 25% by weight, preferably 0.025 to 20% by weight and more particularly 0.1 to 15% by weight, based on the composition, of hydroxy mixed ethers corresponding to formula (I) expressed as active substance. Active substance is defined as the weight of surfactants (expressed as pure substance to 100%) present in the composition.

In another embodiment, the compositions according to the invention contain 0.01 to 30% by weight, preferably 0.1 to 20% by weight and more particularly 0.2 to 15% by weight, based on the composition, of alkyl and/or alkenyl oligoglycosides corresponding to formula (II) expressed as active substance.

Nonionic Surfactants

The cleaning compositions according to the invention may contain other nonionic surfactants. Typical examples of nonionic surfactants are alkoxylates of alkanols, end-capped alkoxylates of alkanols with no free OH groups, alkoxylated fatty acid lower alkyl esters, amine oxides, alkylphenol polyglycol ethers, fatty acid polyglycol esters, fatty acid amide polyglycol ethers, fatty amine polyglycol ethers, alkoxylated triglycerides, mixed ethers and mixed formals, fatty acid-N-alkyl glucamides, protein hydrolyzates (more particularly wheat-based vegetable products), polyol fatty acid esters, sugar esters, sorbitan esters and polysorbates. If the nonionic surfactants contain polyglycol ether chains, they may have a conventional homolog distribution although they preferably have a narrow homolog distribution.

The other nonionic surfactants are preferably selected from the group consisting of alkoxylates of alkanols, more particularly fatty alcohol polyethylene glycol/polypropylene glycol ethers (FAEO/PO) corresponding to formula (III) or fatty alcohol polypropylene glycol/polyethylene glycol ethers (FAPO/EO) corresponding to formula (IV), end-capped alkoxylates of alkanols, more particularly end-capped fatty alcohol polyethylene glycol/polypropylene glycol ethers or end-capped fatty alcohol polypropylene glycol/polyethylene glycol ethers, and fatty acid lower alkyl esters and amine oxides.

Fatty Alcohol Polyethylene Glycol/Polypropylene Glycol Ethers

A preferred embodiment is characterized by the use of optionally end-capped fatty alcohol polyethylene glycol/polypropylene glycol ethers corresponding to formula (III):

$$R^6O(CH_2CH_2O)_n[CH_2(CH_3)CHO]_mR^7 \qquad \text{(III)}$$

in which $R^6$ is an alkyl and/or alkenyl group containing 8 to 22 carbon atoms, $R^7$ is H or an alkyl group containing 1 to 8 carbon atoms, n is a number of 1 to 40, preferably 1 to 30 and more particularly 1 to 15 and m is 0 or a number of 1 to 10.

Fatty Alcohol Polypropylene Glycol/Polyethylene Glycol Ethers

Optionally end-capped fatty alcohol polypropylene glycol/polyethylene glycol ethers corresponding to formula (IV):

$$R^8O[CH_2(CH3)CHO]_q(CH_2CH_2O)_rR^9 \quad (IV)$$

in which $R^8$ is an alkyl and/or alkenyl group containing 8 to 22 carbon atoms, $R^9$ is H or an alkyl group containing 1 to 8 carbon atoms, q is a number of 1 to 5 and r is a number of 0 to 15, are also suitable.

In a preferred embodiment, the compositions according to the invention contain fatty alcohol polyethylene glycol/polypropylene glycol ethers corresponding to formula (III) in which $R^6$ is an aliphatic saturated, linear or branched alkyl group containing 8 to 16 carbon atoms, n is a number of 1 to 10, m is 0 and $R^7$ is hydrogen. These compounds (III) are products of the addition of 1 to 10 mol ethylene oxide onto monohydric alcohols. Suitable alcohols are the above-described alcohols, such as fatty alcohols, oxo alcohols and Guerbet alcohols. Other suitable alcohol ethoxylates are those which have a narrow homolog distribution.

Other suitable representatives of non-end-capped representatives are those corresponding to formula (III) in which $R^6$ is an aliphatic, saturated, linear or branched alkyl group containing 8 to 16 carbon atoms, n is a number of 2 to 7, m is a number of 3 to 7 and $R^7$ is hydrogen. These compounds (III) are products of the addition of monohydric alcohols of the type already described alkoxylated first with 2 to 7 mol ethylene oxide and then with 3 to 7 mol propylene oxide.

The end-capped compounds of formula (III) are terminated by a $C_{1-8}$ alkyl group ($R^7$). In the literature, such compounds are also commonly referred to as mixed ethers. Suitable representatives are methyl-group-terminated compounds of formula (III) in which $R^6$ is an aliphatic, saturated, linear or branched alkyl group containing 8 to 16 carbon atoms, n is a number of 2 to 7, m is a number of 3 to 7 and $R^7$ is a methyl group. Compounds such as these may readily be prepared by reacting the corresponding non-end-capped fatty alcohol polyethylene glycol/polypropylene glycol ethers with methyl chloride in the presence of a base.

Suitable representatives of alkyl-group-terminated compounds are those of formula (III), in which $R^6$ is an aliphatic, saturated, linear or branched alkyl group containing 8 to 16 carbon atoms, n is a number of 5 to 15, m is 0 and $R^7$ is an alkyl group containing 4 to 8 carbon atoms. The end capping is preferably carried out with a linear or branched butyl group by reacting the corresponding fatty alcohol polyethylene glycol ether with n-butyl chloride or with tert.butyl chloride in the presence of bases.

Optionally end-capped fatty alcohol polypropylene glycol/polyethylene glycol ethers of formula (IV) may be present instead of or in admixture with the compounds of formula (III). Compounds such as these are described, for example, in DE-A1-43 23 252. Particularly preferred representatives of the compounds of formula (IV) are those in which $R^8$ is an aliphatic, saturated, linear or branched alkyl group containing 8 to 16 carbon atoms, q is a number of 1 to 5, r is a number of 1 to 6 and $R^9$ is hydrogen. Compounds such as these are preferably products of the addition of 1 to 5 mol propylene oxide and 1 to 6 mol ethylene oxide onto monohydric alcohols which have already been described as suitable in connection with the hydroxy mixed ethers.

Alkoxylated Fatty Acid Lower Alkyl Esters

Suitable alkoxylated fatty acid lower alkyl esters are surfactants corresponding to formula (V):

$$R^{10}CO-(OCH_2CHR^{11})_wOR^{12} \quad (V)$$

in which $R^{10}CO$ is a linear or branched, saturated and/or unsaturated acyl group containing 6 to 22 carbon atoms, $R^{11}$ is hydrogen or methyl, $R^{12}$ represents linear or branched alkyl groups containing 1 to 4 carbon atoms and w is a number of 1 to 20. Typical examples are the formal insertion products of on average 1 to 20 and preferably 5 to 10 mol ethylene and/or propylene oxide into the methyl, ethyl, propyl, isopropyl, butyl and tert.butyl esters of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. Normally, the products are obtained by insertion of the alkylene oxides into the carbonyl ester bond in the presence of special catalysts such as, for example, calcined hydrotalcite. Reaction products of on average 5 to 10 mol ethylene oxide into the ester bond of technical coconut fatty acid methyl esters are particularly preferred.

Amine Oxides

Compounds corresponding to formula (VI) and/or (VII):

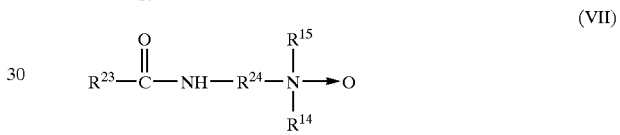

may be used as amine oxides. The amine oxides corresponding to formula (VI) are produced by oxidation of tertiary fatty amines having an least one long alkyl chain in the presence of hydrogen peroxide. In the amine oxides of formula (VI) suitable for the purposes of the invention, $R^{13}$ is a linear or branched alkyl chain containing 6 to 22 and preferably 12 to 18 carbon atoms and $R^{14}$ and $R^{15}$ independently of one another have the same meaning as $R^{13}$ or represent an optionally hydroxysubstituted alkyl group containing 1 to 4 carbon atoms. Preferred amine oxides of formula (VI) are those in which $R^{13}$ and $R^{14}$ represent $C_{12/14}$ or $C_{12/18}$ coconut alkyl groups and $R^{15}$ is a methyl or hydroxyethyl group. Other preferred amine oxides of formula (VI) are those in which $R^{13}$ is a $C_{12/14}$ or $C_{12/18}$ coconut alkyl group and $R^{14}$ and $R^{15}$ represent a methyl or hydroxyethyl group. Other suitable amine oxides are alkylamidoamine oxides corresponding to formula (VII) where the alkylamido group $R^{23}CONH$ is formed by the reaction of linear or branched carboxylic acids preferably containing 6 to 22 and more particularly 12 to 18 carbon atoms, more particularly from $C_{12/14}$ or $C_{12/18}$ fatty acids, with amines. $R^{24}$ is a linear or branched alkylene group containing 2 to 6 and preferably 2 to 4 carbon atoms and $R^{14}$ and $R^{15}$ are as defined for formula (VI).

The other nonionic surfactants may be present in the compositions according to the invention in quantities—expressed as active substance—of 0.1 to 15% by weight, preferably 0.5 to 10% by weight and more particularly 1 to 8% by weight, based on the composition.

According to the invention, the cleaning compositions may contain anionic surfactants.

Anionic Surfactants

Typical examples of anionic surfactants are soaps, alkyl benzenesulfonates, secondary alkane sulfonates, olefin sulfonates, alkyl ether sulfonates, glycerol ether sulfonates, α-methyl ester sulfonates, sulfofatty acids, alkyl and/or alkenyl sulfates, alkyl ether sulfates, glycerol ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, N-acylamino acids such as, for example, acyl lactylates, acyl tartrates, acyl glutamates and acyl aspartates, alkyl oligoglucoside sulfates, protein fatty acid condensates (particularly wheat-based vegetable products) and alkyl (ether) phosphates. If the anionic surfactants contain polyglycol ether chains, the polyglycol ether chains may have a conventional homolog distribution, although they preferably have a narrow homolog distribution.

The anionic surfactants are preferably selected from the group consisting of alkyl and/or alkenyl sulfates, alkyl ether sulfates, alkyl benzenesulfonates, monoglyceride (ether) sulfates and alkanesulfonates, more particularly fatty alcohol sulfates, fatty alcohol ether sulfates, secondary alkanesulfonates and linear alkyl benzenesulfonates.

Alkyl and/or Alkenyl Sulfates

Alkyl and/or alkenyl sulfates, which are often also referred to as fatty alcohol sulfates, are understood to be the sulfation products of primary alcohols which correspond to formula (VIII):

$$R^{16}O\text{—}SO_3X \qquad (VIII)$$

in which $R^{16}$ is a linear or branched, aliphatic alkyl and/or alkenyl group containing 6 to 22 carbon atoms and preferably 12 to 18 carbon atoms and X is an alkali metal and/or alkaline earth metal, ammonium, alkyl ammoium, alkanolammonium or glucammonium.

Typical examples of alkyl sulfates which may be used in accordance with the invention are the sulfation products of caproic alcohol, caprylic alcohol, capric alcohol, 2-ethyl hexyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol and erucyl alcohol and the technical mixtures thereof obtained by high-pressure hydrogenation of technical methyl ester fractions or aldehydes from Roelen's oxo synthesis. The sulfation products may advantageously be used in the form of their alkali metal salts and particularly their sodium salts. Alkyl sulfates based on $C_{16/18}$ tallow fatty alcohols or vegetable fatty alcohols of comparable C chain distribution in the form of their sodium salts are particularly preferred.

Alkyl Ether Sulfates

Alkyl ether sulfates ("ether sulfates") are known anionic surfactants which, on an industrial scale, are produced by $SO_3$ or chlorosulfonic acid (CSA) sulfation of fatty alcohol or oxoalcohol polyglycol ethers and subsequent neutralization. Ether sulfates suitable for use in accordance with the invention correspond to formula (IX):

$$R^{17}O\text{—}(CH_2CH_2O)_aSO_3X \qquad (IX)$$

in which $R^{17}$ is a linear or branched alkyl and/or alkenyl radical containing 6 to 22 carbon atoms, a is a number of 1 to 10 and X is an alkali metal and/or alkaline earth metal, ammonium, alkylammonium, alkanolammonium or glucammonium. Typical examples are the sulfates of addition products of on average 1 to 10 and more particularly 2 to 5 mol ethylene oxide onto caproic alcohol, caprylic alcohol, 2-ethylhexyl alcohol, capric alcohol, lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol and brassidyl alcohol and technical mixtures thereof in the form of their sodium and/or magnesium salts. The ether sulfates may have both a conventional homolog distribution and a narrow homolog distribution. It is particularly preferred to use ether sulfates based on adducts of on average 2 to 3 mol ethylene oxide with technical $C_{12/14}$ or $C_{12/18}$ coconut fatty alcohol fractions in the form of their sodium and/or magnesium salts.

Alkyl Benzenesulfonates

Alkyl benzenesulfonates preferably correspond to formula (X):

$$R^{18}\text{—Ph—}SO_3X \qquad (X)$$

in which $R^{18}$ is a branched, but preferably linear alkyl group containing 10 to 18 carbon atoms, Ph is a phenyl group and X is an alkali metal and/or alkaline earth metal, ammonium, alkyl ammonium, alkanolammonium or glucammonium. Dodecyl benzenesulfonates, tetradecyl benzenesulfonates, hexadecyl benzenesulfonates and technical mixtures thereof in the form of the sodium salts are preferably used.

Monoglyceride (ether)Sulfates

Monoglyceride sulfates and monoglyceride ether sulfates are known anionic surfactants which may be obtained by the relevant methods of preparative organic chemistry. They are normally produced from triglycerides by transesterification to the monoglycerides, optionally after ethoxylation, followed by sulfation and neutralization. The partial glycerides may also be reacted with suitable sulfating agents, preferably gaseous sulfur trioxide or chlorosulfonic acid [cf. EP-B1 0 561 825, EP-B1 0 561 999 (Henkel)]. If desired, the neutralized products may be subjected to ultrafiltration to reduce the electrolyte content to a desired level [DE-A1 42 04 700 (Henkel)]. Overviews of the chemistry of monoglyceride sulfates have been published, for example, by A. K. Biswas et al. in J. Am. Oil. Chem. Soc. 37, 171 (1960) and by F. U. Ahmed in J. Am. Oil. Chem. Soc. 67, 8 (1990). The monoglyceride (ether)sulfates suitable for the purposes of the invention correspond to formula (XI):

$$\begin{array}{l} CH_2O(CH_2CH_2O)_c\text{—}COR^{19} \\ | \\ CH\text{—}O(CH_2CH_2O)_dH \\ | \\ CH_2O(CH_2CH_2O)_e\text{—}SO_3X \end{array} \qquad (XI)$$

in which $R^{19}CO$ is a linear or branched acyl group containing 6 to 22 carbon atoms, c, d and e together stand for 0 or numbers of 1 to 30 and preferably 2 to 10 and X is an alkali metal or alkaline earth metal. Typical examples of monoglyceride (ether)sulfates suitable for the purposes of the invention are the reaction products of lauric acid monoglyceride, coconutfatty acid monoglyceride, palmitic acid monoglyceride, stearic acid monoglyceride, oleic acid monoglyceride and tallow fatty acid monoglyceride and ethylene oxide adducts thereof with sulfur trioxide or chlorosulfonic acid in the form of their sodium salts. Monoglyceride sulfates corresponding to formula (XI), in which $R^{19}CO$ is a linear acyl group containing 8 to 18 carbon atoms, are preferably used.

Alkanesulfonates

Alkane sulfonates are understood to be compounds corresponding to formula (XII):

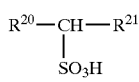

where $R^{20}$ and $R^{21}$ stand for alkyl groups and, together, should contain no more than 50 carbon atoms.

The cleaning compositions may advantageously contain 0.1 to 20% by weight, preferably 0.25 to 15% by weight and more particularly 0.4 to 10% by weight, based on the composition, of anionic surfactants, expressed as active substance. The balance to 100% by weight of the compositions may be made up by auxiliaries and water.

The compositions according to the invention may contain, for example, solubilizers, such as cumenesulfonate, ethanol, isopropyl alcohol, ethylene glycol, propylene glycol, butyl glycol, diethylene glycol, propylene glycol monobutyl ether, polyethylene or polypropylene glycol ether with molecular weights of 600 to 1,500,000 and preferably in the range from 400,000 to 800,000 or, more particularly, butyl diglycol as typical ingredients or auxiliaries and additives. Abrasives, such as silica flour or wood flour or polyethylene friction elements, may also be present. In many cases, an additional bactericidal effect is required so that the compositions may contain cationic surfactants or biocides, for example glucoprotamine.

Suitable builders are zeolites, layer silicates, phosphates and ethylenediamine tetraacetic acid, nitrilotriacetic acid, citric acid and salts thereof and inorganic phosphonic acids.

Among the compounds acting as peroxy bleaching agents, sodium perborate tetrahydrate and sodium perborate monohydrate are particularly important. Other bleaching agents are, for example, peroxycarbonate, citrate perhydrates and $H_2O_2$-yielding peracidic salts of the per acids, such as perbenzoates, peroxyphthalates or diperoxydodecanedioic acid. They are normally used in quantities of 0.1 to 40% by weight. Sodium perborate monohydrate in quantities of 10 to 20% by weight and more particularly 10 to 15% by weight is preferably used.

Suitable enzymes are those from the class of proteases, lipases, amylases, cellulases or mixtures thereof. Enzymes obtained from bacterial strains or fungi, such as *Bacillus subtilis, Bacillus licheniformis* and *Streptomyces griseus* are particularly suitable. Proteases of the subtilisin type, particularly proteases obtained from *Bacillus lentus*, are preferably used. The percentage content of enzymes may be from about 0.1 to 6% by weight and is preferably from 0.2 to 2% by weight. The enzymes may be adsorbed onto carriers or encapsulated in membrane materials to protect them against premature decomposition.

In addition to mono- and polyhydric alcohols and phosphonates, the compositions may contain other enzyme stabilizers. For example, 0.5 to 1% by weight sodium formate may be used. Proteases stabilized with soluble calcium salts which have a calcium content of preferably about 1.2% by weight, based on the enzyme, may also be used. However, it is of particular advantage to use boron compounds, for example boric acid, boron oxide, borax and other alkali metal borates, such as the salts of orthoboric acid ($H_3BO_3$), metaboric acid ($HBO_2$) and pyroboric acid (tetraboric acid $H_2B_4O_7$).

Where the compositions are used in machine cleaning processes, it can be of advantage to add typical foam inhibitors to them. Suitable foam inhibitors contain, for example, known organopolysiloxanes and/or paraffins or waxes. The compositions may also contain foam regulators, for example soap, fatty acids, more particularly coconut oil fatty acid and palm kernel oil fatty acid.

Suitable thickeners are, for example, hydrogenated castor oil, salts of long-chain fatty acids which are preferably used in quantities of 0 to 5% by weight and more particularly in quantities of 0.5 to 2% by weight, for example sodium, potassium, aluminium, magnesium and titanium stearates or the sodium and/or potassium salts of behenic acid and other polymeric compounds. These other polymeric compounds are preferably polyvinyl pyrrolidone, urethanes and the salts of polymeric polycarboxylates, for example homopolymeric or copolymeric polyacrylates, polymethacrylates and in particular copolymers of acrylic acid with maleic acid, preferably those of 50 to 10% by weight maleic acid. The relative molecular weight of the homopolymers is generally in the range from 1,000 to 100,000 and that of the copolymers in the range from 2,000 to 200,000 and preferably in the range from 50,000 to 120,000, based on the free acid. Water-soluble polyacrylates crosslinked, for example, with about 1% of a polyallyl ether of sucrose and having a molecular weight above 1,000,000 are also particularly suitable. Examples include the polymers obtainable under the name of Carbopol® 940 and 941. The crosslinked polyacrylates are preferably used in quantities of not more than 1% by weight and more particularly in quantities of 0.2 to 0.7% by weight.

Another preferred embodiment of the invention are compositions, particularly for automatic dishwashers, which contain 0.1 to 15 and preferably 0.5 to 12% by weight of surfactants containing hydroxy mixed ethers of formula (I), more particularly those with a degree of ethoxylation x of 40 to 60 end-capped by an epoxide containing in all 12 carbon atoms (R2=10) produced from a native fatty alcohol containing 8 to 10 carbon atoms. The compositions according to the invention additionally contain 5 to 90 and preferably 10 to 80% by weight of builders, 0.1 to 6% by weight of detergent enzyme, optionally 0.1 to 40 and preferably 0.5 to 30% by weight of bleaching agent and auxiliaries and additives (percentages by weight, based on the composition).

The present invention also relates to the use of hydroxy mixed ethers corresponding to formula (I) in laundry detergents, dishwashing detergents and cleaners, more particularly for washing and cleaning hard surfaces, preferably in the home and in the industrial and institutional sectors. The hydroxy mixed ethers are particularly suitable for use in dishwashing detergents, rinse agents, bathroom cleaners, floor cleaners, so-called clean shower cleaners (for example bathroom cleaners which are sprayed onto walls and fittings before and after showering so that the water and soap residues drain off better so that no wiping is necessary), cockpit cleaners (cars, aircraft, ships, motorbikes), window cleaners and all-purpose cleaners. Hard surfaces are inter alia ceramic surfaces, metal surfaces, painted surfaces, plastic surfaces and surfaces of glass, stone, concrete, china and wood.

The use of the hydroxy mixed ethers of formula (I) according to the invention is particularly preferred for improving wetting behavior in laundry detergents, dishwashing detergents and cleaners, preferably on hard surfaces, more especially in dishwasher detergents and/or rinse agents.

In another preferred embodiment, the hydroxy mixed ethers of formula (I) are used in combination with alkyl and/or alkenyl oligoglycosides for the cleaning applications mentioned in the foregoing.

In a particularly preferred embodiment, the hydroxy mixed ethers of formula (I) are used, optionally in combination with the other surfactants already described, for the simplified production of solid cleaning formulations. By virtue of their relatively high melting points, the hydroxy mixed ethers according to the invention are relatively easy to incorporate in laundry detergent, dishwashing detergent and cleaning formulations, more particularly in solid cleaners.

The hydroxy mixed ethers of formula (I) are also preferably used as defoamers in laundry detergents, dishwashing detergents and cleaners, more especially in dishwasher detergents and/or rinse agents.

The hydroxy mixed ethers according to the invention are distinguished by their favorable foam-suppressing effect, their favorable wetting effect, their high compatibility, particularly with plastics, and by their relatively high melting points. Hitherto, hydroxy mixed ethers with a relatively high degree of alkoxylation showed an improved wetting effect, but a poor defoaming effect. This effect is not in evidence in the hydroxy mixed ethers according to the invention. Despite their favorable wetting effect, the hydroxy mixed ethers according to the invention have very good foaming behavior.

Above all, their high melting points make the hydroxy mixed ethers according to the invention suitable for the simplified production of solid formulations. By virtue of their relatively high melting points, these hydroxy mixed ethers also dissolve later in the wash liquor and develop their effect with delay and in a relatively high concentration. This effect can be used to particular advantage in "clear rinse" applications. Surprisingly, the hydroxy mixed ethers according to the invention are distinguished above all by their colorless clear appearance which enables them to be incorporated for the first time in a number of laundry/dishwashing detergents and cleaners without any need for expensive bleaching beforehand.

EXAMPLES

Screening Method for Evaluating the Wetting Properties of Surfactant Solutions on Plastics The wetting properties of surfactant solutions on plastics were determined in a simplified screening test under the conditions/test parameters in a commercially available dishwasher, but without actually using one.

To evaluate the wetting properties, plastic test specimens measuring 20×5 cm are cleaned first with 1% NaOH and then with isopropanol. The test specimens thus pretreated are then immersed in the solution to be tested and immediately withdrawn again. Evaluation is carried out visually by drawing up a ranking list or on a scoring scale of 1 to 5 where a score of 5 means that the liquid film breaks up spontaneously and the wetting effect is completely eliminated. A score of 5 is obtained where water is used. A score of 1 signifies complete wetting of the plastic surface and uniform drainage of the liquid film. A score of 1 is obtained where Na-LAS (for example Maranil A55® COGNIS) is used.

In addition, the time taken by the liquid film to drain completely was determined at 20° C. and 60° C. The results are set out in Table 1a.

| Test parameters: | |
| --- | --- |
| Water hardness: | 2° d |
| Salt content: | 700 ppm |
| Temperature: | 60° C. |
| Surfactant concentration: | 0.1% |

Test specimens:

PP (polypropylene); PE (polyethylene); PC (polycarbonate)

The test results are set out in Table 1 where C1 to C4 are Comparison Examples and I, II and III are the Examples according to the invention.

TABLE 1

Wetting properties on plastics

| Composition in % active substance | C1 | C2 | C3 | C4 | I | II | III |
| --- | --- | --- | --- | --- | --- | --- | --- |
| $C_{8-10}$ fatty alcohol + 60EO-2-hydroxydodecylether | — | — | — | — | — | — | 0.1 |
| $C_{8-10}$ fatty alcohol + 40EO-2-hydroxydodecylether | — | — | — | — | — | 0.1 | — |
| $C_{8-10}$ fatty alcohol + 30EO-2-hydroxydodecylether | — | — | — | — | 0.1 | — | — |
| $C_{8-10}$ fatty alcohol + 10EO-2-hydroxydodecylether | — | — | — | 0.1 | — | — | — |
| Poly Tergent SLF-18B-45* | — | — | 0.1 | — | — | — | — |
| Maranil A 55 (Na-LAS) | — | 0.1 | — | — | — | — | — |
| Water, 2° d/700 ppm NaCl | 100 | 99.9 | 99.9 | 99.9 | 99.9 | 99.9 | 99.9 |
| Wetting properties on plastics | | | | | | | |
| Temperature: 60° C./plastic "PP" | 5 | 1 | 3 | 4 | 3 | 2 | 3 |
| Temperature: 60° C./plastic "PE" | 5 | 1 | 3 | 4 | 3 | 2 | 3 |
| Temperature: 60° C./plastic "PC" | 5 | 1 | 4 | 3 | 2 | 2 | 3 |

*Alcohol alkoxylate from Olin Chemicals containing 1 PO and 22 EO

TABLE 1a

| Wetting power | 20° C. | 60° C. |
| --- | --- | --- |
| Poly Tergent SLF-18B-45* | 30 s | >100 s |
| $C_{8-10}$ fatty alcohol + 40EO 2-hydroxydodecylether | 30 s | 30 s |

*Alcohol alkoxylate from Olin Chemicals containing 1PO and 22EO

The highly ethoxylated hydroxy mixed ethers retain their favorable wetting power despite the increase in temperature.

In the stress cracking test, the plastic test specimens are briefly exposed to the product to be tested by immersion or spraying. The adhering product is not removed. After hours, the immersion or spraying treatment is repeated. In all, the plastics are exposed to the test medium five times. The concluding evaluation is made visually after 14 days. The scores have the following meanings:

"1"=unchanged
"2"=incipient crack/small crack
"3"=continuous crack
"4"=failure

The Examples according to the invention are shown under column headings I and II in Table 2.

TABLE 2

Stress cracking test

| Composition in % active substance | C1 | C2 | C3 | I | II |
|---|---|---|---|---|---|
| $C_{8-10}$ fatty alcohol + 60EO-2-hydroxydodecylether | — | — | — | — | 5 |
| $C_{8-10}$ fatty alcohol + 40EO-2-hydroxydodecylether | — | — | — | 5 | — |
| $C_{8-10}$ fatty alcohol + 10EO-2-hydroxydodecylether | — | — | 5 | — | — |
| Poly Tergent SLF-18B-45* | — | 5 | — | — | — |
| Water, deionized | 100 | 95 | 95 | 95 | 95 |
| Stress cracking test on plastics Evaluation after 14 days | | | | | |
| Terez 3010 (acrylonitrile/butadiene/styene) | 1 | 4 | 4 | 3 | 2 |
| Makrolon 3103 (polycarbonate) | 1 | 3 | 3 | 2 | 2 |

*Alcohol alkoxylate from Olin Chemicals containing 1 PO and 22 EO

The melting points of the hydroxy mixed ethers are shown in Table 3.

TABLE 3

| Melting points/ranges | ° C. |
|---|---|
| $C_{8-10}$ fatty alcohol + 60EO-2-hydroxydodecylether | 48 |
| $C_{8-10}$ fatty alcohol + 40EO-2-hydroxydodecylether | 43 |
| $C_{8-10}$ fatty alcohol + 30EO-2-hydroxydodecylether | 38–39 |
| $C_{8-10}$ fatty alcohol + 10EO-2-hydroxydodecylether | Liquid at room temperature with clouding |
| Poly Tergent SLF-18B-45* | 27–32 |

*Alcohol alkoxylate from Olin Chemicals containing 1PO and 22EO

The foaming behavior of the surfactants is described in Table 4.

In order to determine the foaming behavior of the surfactant mixtures, 2 eggs (ca. 100 to 110 g) with diluted with water (hardness 16° d) in a ratio of 1:1 in an electric mixer and stirred for 2 minutes. 100 g of the resulting emulsion were then made up to 500 ml with water (hardness 16° d) in a 2,000 ml capacity double-walled measuring cylinder and heated to 50° C. By means of a laboratory flow inducer, the solution was taken in from the bottom of the measuring cylinder with a glass tube. It was returned through a second tube of which the lower end ended at the 2,000 ml mark of the measuring cylinder. The liquid was pump-circulated at a rate of 4 ml/minute. This generates foam. The solution was circulated until the volume of foam was 2,000 ml. After reaching the 2,000 ml mark, 0.1 g of the hydroxy mixed ether according to the invention (Example III) and (in a second test) for comparison 0.1 g of a commercially available standard for rinse agents (Example C4) were added to the mixture. The volume of the foam formed and the liquid was read off after 0.5, 1, 2, 3, 5, 10,20 and 30 mins. The results are set out in Table 4.

| Composition in % active substance | C4 | III |
|---|---|---|
| $C_{8/10}$ fatty alcohol + 40EO 2-hydroxydodecylether | — | 0.1 |
| $C_{12/14}$ fatty alcohol + 5EO – 4PO (most important market standard for rinse agents) | 0.1 | — |

TABLE 4

| Foam volume | C4 ml | III ml |
|---|---|---|
| Before addition of the surfactants | 2,000 | 2,000 |
| 0.5 minute | 1,900 | 1,700 |
| 1 minute | 1,900 | 1,280 |
| 2 minutes | 1,400 | 880 |
| 3 minutes | 1,200 | 880 |
| 5 minutes | 900 | 800 |
| 10 minutes | 950 | 860 |
| 20 minutes | 1,000 | 980 |
| 30 minutes | 1,100 | 1,000 |

What is claimed is:

1. A hydroxy mixed ether of the general formula (I):

$$R^1O[CH_2CH_2O]_xCH_2CH(OH)R^2 \qquad (I)$$

wherein $R^1$ represents a linear or branched, alkyl or alkenyl group having from 4 to 22 carbon atoms; $R^2$ represents a linear or branched, alkyl or alkenyl group having from 2 to 22 carbon atoms; and x represents a number of from 40 to 80.

2. The hydroxy mixed ether according to claim 1, wherein x represents a number of from 40 to 60.

3. The hydroxy mixed ether according to claim 1, wherein $R^1$ represents a linear or branched, alkyl or alkenyl group having from 6 to 16 carbon atoms.

4. The hydroxy mixed ether according to claim 2, wherein $R^1$ represents a linear or branched, alkyl or alkenyl group having from 6 to 16 carbon atoms.

5. The hydroxy mixed ether according to claim 1, wherein $R^1$ represents a linear or branched, alkyl or alkenyl group having from 8 to 12 carbon atoms; $R^2$ represents a linear or branched, alkyl or alkenyl group having from 8 to 12 carbon atoms.

6. The hydroxy mixed ether according to claim 2, wherein $R^1$ represents a linear or branched, alkyl or alkenyl group having from 8 to 12 carbon atoms; $R^2$ represents a linear or branched, alkyl or alkenyl group having from 8 to 12 carbon atoms.

7. The hydroxy mixed ether according to claim 1, wherein $R^1$ represents a $C_{8-10}$ alkyl group; $R^2$ represents a linear $C_{10}$ alkyl group and x represents a number of from 40 to 60.

8. A composition comprising: (a) a hydroxy mixed ether of the general formula (I):

$$R^1O[CH_2CH_2O]_xCH_2CH(OH)R^2 \qquad (I)$$

wherein $R^1$ represents a linear or branched, alkyl or alkenyl group having from 4 to 22 carbon atoms; $R^2$ represents a linear or branched, alkyl or alkenyl group having from 2 to 22 carbon atoms; and x represents a number of from 40 to 80; and (b) one or more additional components selected from the group consisting of alkyl and/or alkenyl oligoglycosides, other nonionic surfactants, anionic surfactants, builders, and enzymes.

9. The composition according to claim 8, wherein $R^1$ represents a linear or branched, alkyl or alkenyl group having from 8 to 12 carbon atoms; $R^2$ represents a linear or branched, alkyl or alkenyl group having from 8 to 12 carbon atoms.

10. The composition according to claim 8, wherein $R^1$ represents a $C_{8-10}$ alkyl group; $R^2$ represents a linear $C_{10}$ alkyl group and x represents a number of from 40 to 60.

11. The composition according to claim 8, wherein the one or more components comprises an alkyl and/or alkenyl oligoglycoside of the general formula (II):

$$R^5O\text{---}[G]_p \qquad (II)$$

wherein $R^5$ represents an ailcyl and/or alkenyl group having from 4 to 22 carbon atoms; G represents a sugar unit having 5 or 6 carbon atoms; and p represents a number of from 1 to 10.

12. The composition according to claim 11, wherein $R^5$ represents an alkyl group having from 6 to 16 carbon atoms and p represents a number of from 1 to 3.

13. The composition according to claim 8, wherein the hydroxy mixed ether is present in an amount of from 0.01 to 25% by weight.

14. The composition according to claim 11, wherein the alkyl and/or alkenyl oligoglycoside is present in an amount of from 0.01 to 30% by weight.

15. The composition according to claim 11, wherein the hydroxy mixed ether is present in an amount of from 0.01 to 25% by weight, and wherein the alkyl and/or alkenyl oligoglycoside is present in an amount of from 0.01 to 30% by weight.

16. The composition according to claim 8, wherein the one or more components comprises a nonionic surfactant selected from the group consisting of alkoxylates of alkanols, end-capped alkoxylates of alkanols having no free hydroxyl groups, alkoxylated fatty acid lower alkyl esters and amine oxides.

17. The composition according to claim 16, wherein the nonionic surfactant is present in an amount of from 0.1 to 15% by weight.

18. The composition according to claim 13, wherein the one or more components comprises a nonionic surfactant selected from the group consisting of alkoxylates of alkanols, end-capped alkoxylates of alkanols having no free hydroxyl groups, alkoxylated fatty acid lower alkyl esters and amine oxides.

19. The composition according to claim 18, wherein the nonionic surfactant is present in an amount of from 0.1 to 15% by weight.

20. The composition according to claim 8, wherein the one or more components comprises an anionic surfactant selected from the group consisting of alkyl sulfates, alkenyl sulfates, alkyl ether sulfates, alkyl benzenesulfonates, monoglyceride(ether)sulfates and alkanesulfonates.

21. The composition according to claim 20, wherein the anionic surfactant is present in an amount of from 0.1 to 20% by weight.

22. The composition according to claim 8, wherein the hydroxy mixed ether is present in an amount of from 0.1 to 15% by weight, and wherein the one or more additional components comprises a builder present in an amount of from 5 to 90% by weight, and a detergent enzyme present in an amount of from 0.1 to 6% by weight.

23. The composition according to claim 22, further comprising a bleaching agent present in an amount of from 0.1 to 40% by weight.

24. A method of improving wetting properties of a detergent/cleaner composition, said method comprising: (a) providing a hydroxy mixed ether of the general formula (I):

$$R^1O[CH_2CH_2O]_xCH_2CH(OH)R^2 \qquad (I)$$

wherein $R^1$ represents a linear or branched, alkyl or alkenyl group having from 4 to 22 carbon atoms; $R^2$ represents a linear or branched, alkyl or alkenyl group having from 2 to 22 carbon atoms; and x represents a number of from 40 to 80; and (b) combining the hydroxy mixed ether with a detergent/cleaner composition comprising one or more surfactant compounds.

25. A method of increasing plastic compatibility of a detergent/cleaner composition, said method comprising: (a) providing a hydroxy mixed ether according to claim 1; and (b) combining the hydroxy mixed ether with a detergent/cleaner composition comprising one or more surfactant compounds.

* * * * *